United States Patent
Jha

(10) Patent No.: US 7,251,491 B2
(45) Date of Patent: Jul. 31, 2007

(54) SYSTEM OF AND METHOD FOR USING POSITION, VELOCITY, OR DIRECTION OF MOTION ESTIMATES TO SUPPORT HANDOVER DECISIONS

(75) Inventor: Anjali Jha, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 10/632,400

(22) Filed: Jul. 31, 2003

(65) Prior Publication Data

US 2005/0026619 A1 Feb. 3, 2005

(51) Int. Cl.
*H04Q 7/20* (2006.01)

(52) U.S. Cl. .................... 455/441; 455/436

(58) Field of Classification Search .......... 455/456.1, 455/441, 67.11, 437, 440, 436, 574, 456.5, 455/450, 517, 11.1; 340/992; 342/457, 342/418

See application file for complete search history.

(56) References Cited

U.S. PATENT DOCUMENTS

| | | | | |
|---|---|---|---|---|
| 5,548,806 | A * | 8/1996 | Yamaguchi et al. | 455/441 |
| 6,052,598 | A * | 4/2000 | Rudrapatna et al. | 455/456.1 |
| 6,061,021 | A * | 5/2000 | Zibell | 342/418 |
| 6,192,245 | B1 * | 2/2001 | Jones et al. | 455/437 |
| 6,216,002 | B1 * | 4/2001 | Holmring | 455/436 |
| 6,337,990 | B1 * | 1/2002 | Koshino | 455/574 |
| 6,370,357 | B1 * | 4/2002 | Xiao et al. | 455/67.11 |
| 6,385,454 | B1 * | 5/2002 | Bahl et al. | 455/450 |
| 6,400,320 | B1 * | 6/2002 | Stilp et al. | 342/457 |
| 6,484,030 | B1 * | 11/2002 | Antoine et al. | 455/444 |
| 6,611,688 | B1 * | 8/2003 | Raith | 340/992 |
| 6,711,408 | B1 * | 3/2004 | Raith | 455/440 |
| 6,718,174 | B2 * | 4/2004 | Vayanos | 455/456.1 |
| 6,721,567 | B1 * | 4/2004 | Wang et al. | 455/440 |
| 6,801,782 | B2 * | 10/2004 | McCrady et al. | 455/517 |
| 6,907,255 | B2 * | 6/2005 | Kawamoto | 455/456.5 |
| 7,013,111 | B2 * | 3/2006 | Kuwahara et al. | 455/11.1 |

FOREIGN PATENT DOCUMENTS

| | | |
|---|---|---|
| EP | 1077579 | 2/2001 |
| WO | 0028768 | 5/2000 |

* cited by examiner

*Primary Examiner*—Joseph Feild
*Assistant Examiner*—Kiet Doan
(74) *Attorney, Agent, or Firm*—Thomas Rouse; Bruce W. Greenhaus; Andrea L. Mays

(57) ABSTRACT

A method of and system for supporting a handover decision in a wireless communication system is described. An estimate of the position, velocity or direction of motion of a subscriber station is obtained. The estimate, or information derived there-from, is then used to support a handover decision. In one embodiment, an estimate of the velocity of the subscriber station is obtained if the handover rate experienced by the subscriber station exceeds a threshold while the subscriber station is within the coverage area of an umbrella cell. A decision is made to handover the subscriber station to the umbrella cell if the estimate of the velocity of the subscriber station exceeds a threshold. In a second embodiment, one or more estimates of the position, velocity, or direction of motion of the subscriber station are obtained responsive to the subscriber station experiencing a directed retry condition. A decision is made to handover the subscriber station from a serving cell to a target cell if the one or more estimates indicate that (1) the subscriber station is located closer to the target cell than the serving cell; or (2) the subscriber station is moving towards the target cell and away from the serving cell.

18 Claims, 9 Drawing Sheets

SYSTEM OF AND METHOD FOR USING POSITION, VELOCITY, OR DIRECTION OF MOTION ESTIMATES TO SUPPORT HANDOVER DECISIONS

FIELD OF THE INVENTION

This invention relates to the fields of position determination and wireless communications, and, more specifically, to the use of position, velocity or direction of motion estimates to support handover decisions in wireless communications systems.

RELATED ART

In wireless communications systems, handover refers to the process whereby the responsibility for providing communications services to a subscriber station is transferred from one network, network entity or network resource to another. The handover may be a hard handover, i.e., one in which the transition between handling by the servicing network, entity or resource and handling by the target network, entity or resource is abrupt, or a soft handover, i.e., one in which this transition is gradual. Furthermore, the handover may be triggered in response to a variety of conditions, such as detection at the subscriber station of a weakening of signal strength of the servicing network, entity or resource relative to that of the target network, entity or resource, or a directed retry condition, pursuant to a blocked call or the like, giving rise to the need for load balancing.

For example, consider an umbrella cell 100 in a wireless communications system as illustrated in FIG. 1. The umbrella cell 100 has one or more micro-level cells 102a, 102b having coverage areas contained within or at least partially overlapping that of the umbrella cell 100. These micro-level cells are typically added to high congestion areas within the umbrella cell 100. When a subscriber station is within the coverage area of one of these micro-level cells, it is typically serviced by the base station in the micro-level cell in contrast to that of the umbrella cell to avoid overloading the umbrella cell base station. When a subscriber station is moving within the coverage area of one of these umbrella cells, situations can arise where the number of handovers triggered by the movement of the subscriber station is excessive.

In FIG. 1, for example, a subscriber station within vehicle 104 and moving along path 106 is being serviced by the base station for umbrella cell 100 while at location 108. At about location 110, when the subscriber station transitions into the coverage area of cell 102a, a handover to the base station for cell 102a is initiated. Then, at about location 112, when the subscriber station transitions into the coverage area of cell 102b, a handover to the base station for cell 102b is initiated. Then, at about location 114, when the subscriber station transitions back into the coverage area of the umbrella cell 100, a handover to the base station for the umbrella cell is initiated. If the subscriber station is moving at a high rate of speed, these handovers can occur within a very short period of time.

However, a handover is a high priority event which consumes a substantial amount of network resources or overhead to implement. Consider a handover between two base stations triggered when the communication quality of the servicing base station deteriorates relative to that of the target base station. The resources needed to implement this handover include resources needed to detect the triggering event, resources needed to signal the handover command, and resources needed to handle the acknowledgements between the various network entities involved. These network entities may include not only the subscriber station and the two base stations, but also the base station controller common to the two stations, and the mobile switching center servicing the base station controller. Therefore, if a subscriber station experiences a high handover rate, i.e., a large number of handovers within a prescribed period of time, the overhead needed to achieve these handovers may unduly burden the network, thereby using resources which could be used for traffic. Note that micro-cells are usually high traffic cells and any extra overhead has significant impact on traffic capacity.

A similar problem can occur when a subscriber station is located near the coverage areas of two or more cells are not necessarily in an umbrella cell/micro-cell relationship. In this scenario, situations can arise in which excessive and unnecessary handovers are generated. Consider, for example, FIG. 2A, which illustrates a subscriber station within vehicle 204 located within an overlapping portion 206 of the coverage areas of cells 202a and 202b. Assume that the subscriber station is being serviced by the base station of cell 202a, and experiences a blocked call while located within the overlapping portion 206. In response, the network initiates a directed retry of the call, which in turn forces a handover of the blocked call to the base station of cell 202b to allow the call to proceed without the need to queue the call.

If the subscriber station is following a path in which it is traveling towards cell 202a and away from cell 202b, such as the path 208 identified in FIG. 2A, the handover will soon be followed by another handover back to cell 202a. Once again, an excessive number of handovers may be experienced that unduly burden the network.

Directed retry may also occur when the subscriber station is not within the overlapping portion of the coverage areas of two cells. Consider FIG. 2B, which illustrates a subscriber station within vehicle 204 located within the coverage area of cell 202a but outside the coverage area of cell 202b. Assume the subscriber station experiences a blocked call condition while being serviced by the base station within cell 202a. In response, the network initiates a directed retry of the call, which in turn forces a handover of the blocked call to the neighboring base station having less traffic load, in this case, the base station of cell 202b.

SUMMARY

A method of supporting a handover decision in a wireless communications system is described. The method comprises obtaining an estimate of the position, velocity or direction of motion of a subscriber station, and then using this estimate, or information derived there-from, to support the handover decision.

The method may occur in response to a triggering event. In one embodiment, the triggering event is a determination that the handover rate experienced by the subscriber station exceeds a threshold. This determination is made while the subscriber station is moving within the coverage area of an umbrella cell. This determination may in turn be prompted by a handover to a micro-cell at least partially within the coverage area of the umbrella cell. In response, an estimate of the velocity of the subscriber station is obtained. If this velocity estimate exceeds a threshold, a decision is made to handover the subscriber station to the umbrella cell, and a handover back to a micro-cell is blocked, at least for a time.

In a second embodiment, the triggering event is a directed retry condition. In response to this condition, an estimate of the position, velocity or direction of motion of the subscriber station is obtained. This estimate, or information derived there-from, is then used to support a handover decision.

In one implementation, one or more estimates are obtained. A decision is made to handover the subscriber station to a target cell if the one or more estimates indicate (1) the subscriber station is located closer to the target cell than the serving cell; or (2) the subscriber station is moving towards the target cell and away from the serving cell.

Other or related systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4 is a flowchart of an embodiment of a method of supporting a handover decision with an estimate of the position, velocity or direction of motion of a subscriber station, or information derived there-from.

DETAILED DESCRIPTION

As utilized herein, terms such as "about", "approximately", "substantially" and "near" are intended to allow some leeway in mathematical exactness to account for tolerances that are acceptable in the trade. Accordingly, any deviations upward or downward from the value modified by the terms "about", "approximately", "substantially" or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general-or special-purpose microprocessor, finite state machine, controller, computer, digital signal processor (DSP), or the like.

The term "logic" refers to implementations of functionality in hardware, software, or any combination of hardware and software.

The phrase "base station" (BTS) includes individual sectors.

The phrase "GPS satellite" includes space vehicles (SVs).

The phrase "position determination system" means any system for determining the position of a subscriber station in a wireless communications system, and includes position determination systems overlaid onto or integrated into wireless communications systems. Examples include assisted GPS positioning systems, network based positioning systems, and standalone GPS positioning systems.

The term "subscriber station" includes mobile stations and any portable radio device used in a cellular wireless network.

The term "wireless communication system" includes any wireless communications system employing any multiple access mode or protocol, such as but not limited to IS-95 (CDMA), CDMA 2000, WCDMA, GSM, and GPRS systems.

The term "micro-cell" means any cell having a coverage area at least partially within or overlapping that of an umbrella cell, and includes a pico-cell.

The term "threshold" means any threshold and includes, without limitation, static, predetermined, and dynamic thresholds. The term also includes thresholds chosen statically or dynamically by the operator to ensure best network performance.

EXAMPLE ENVIROMENT

Figure 1:
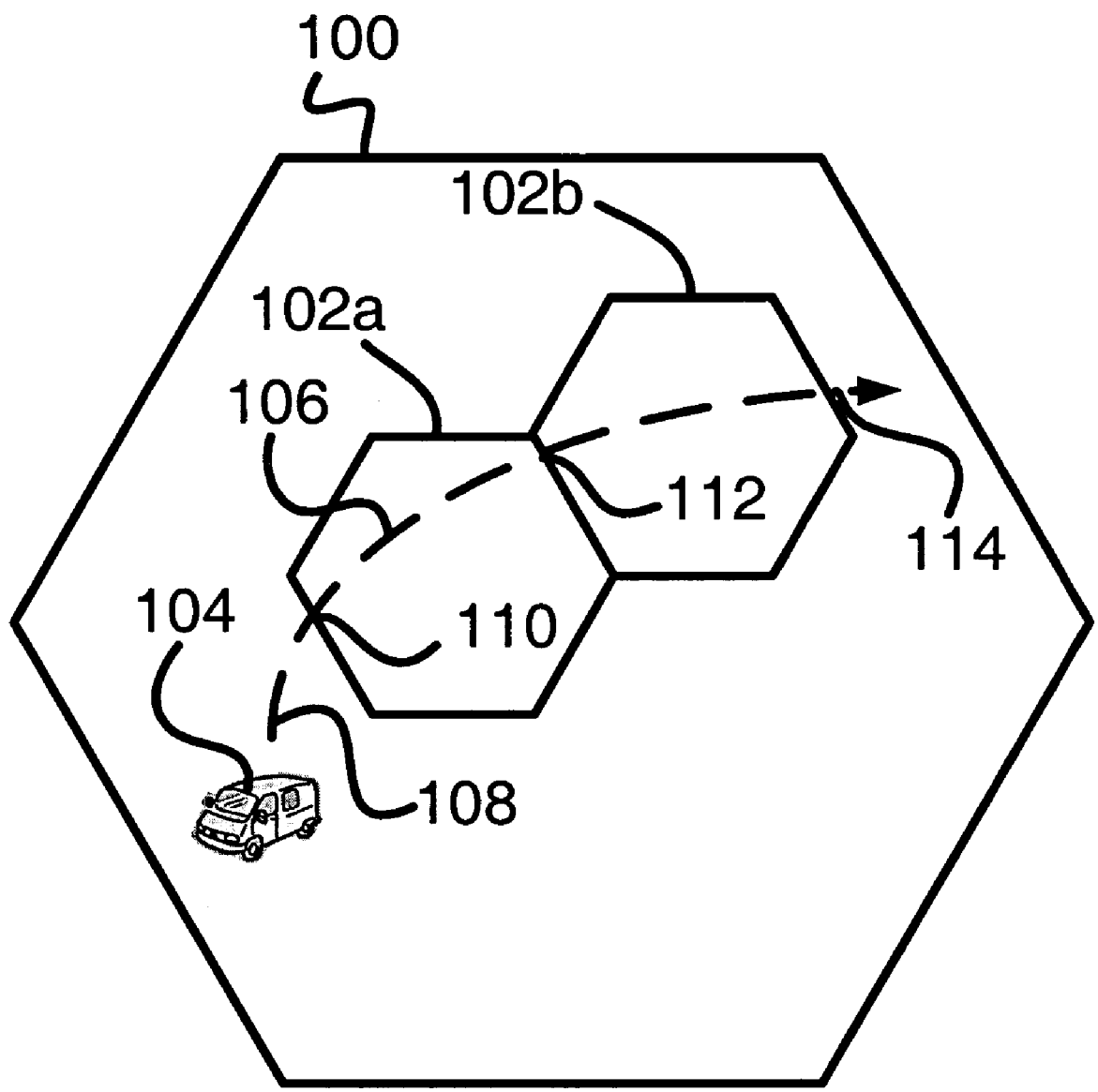
FIG. 1 illustrates an example of a subscriber station moving within the coverage area of an umbrella cell.
Figure 2A:
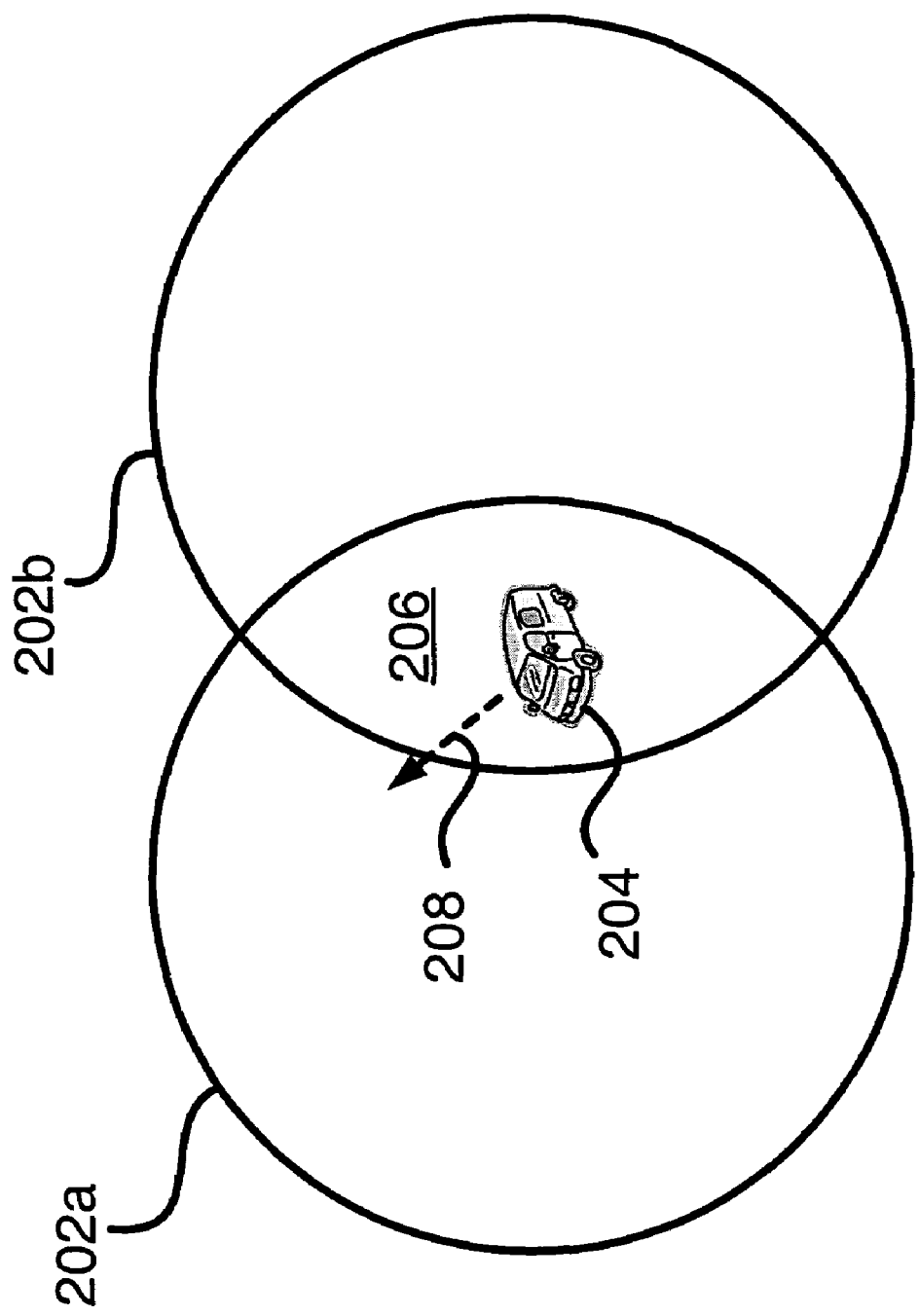
FIGS. 2A-2B illustrate examples of a subscriber station moving near the coverage areas of two or more cells while experiencing a directed retry condition.
Figure 2B:
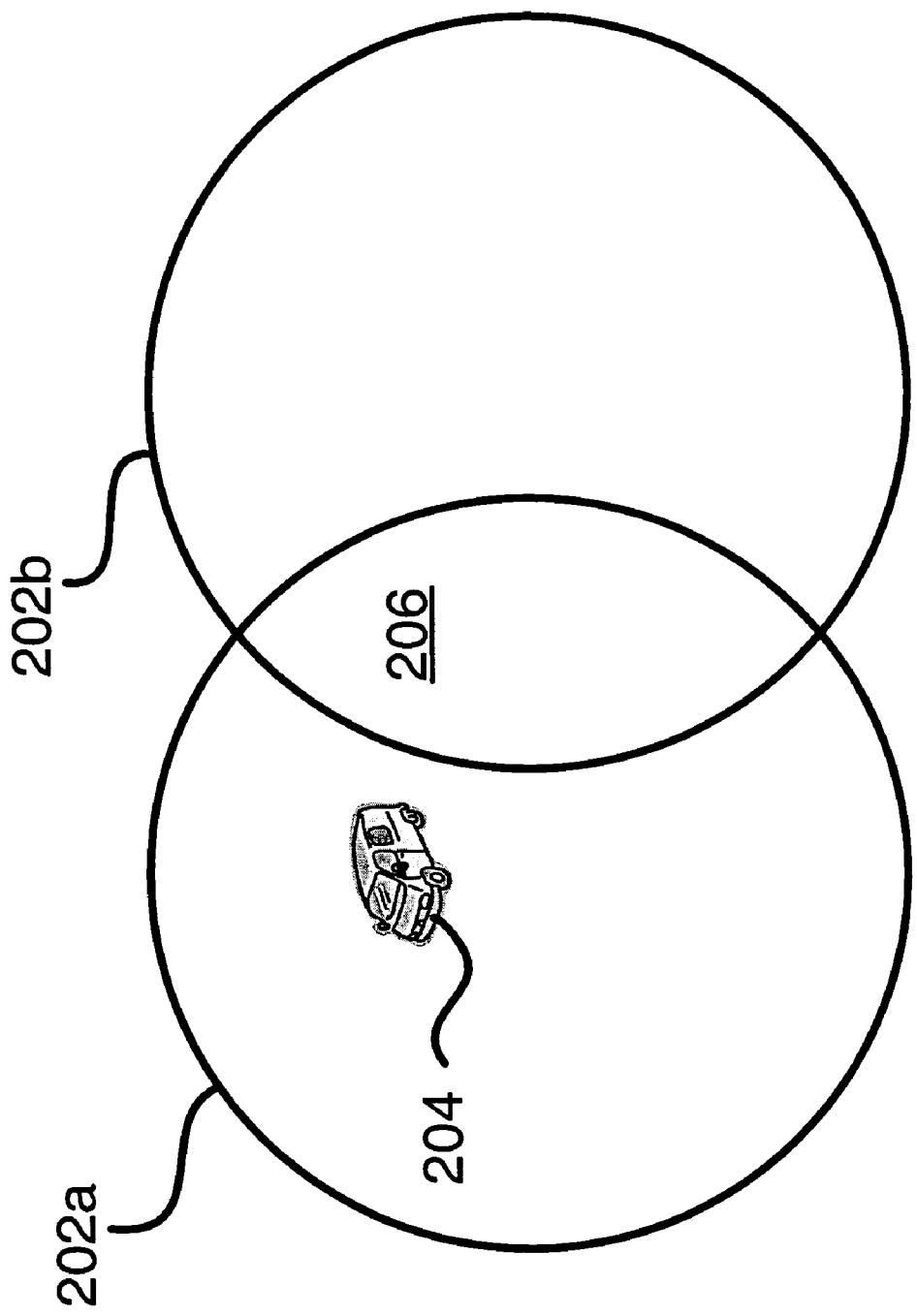
Figure 3A:
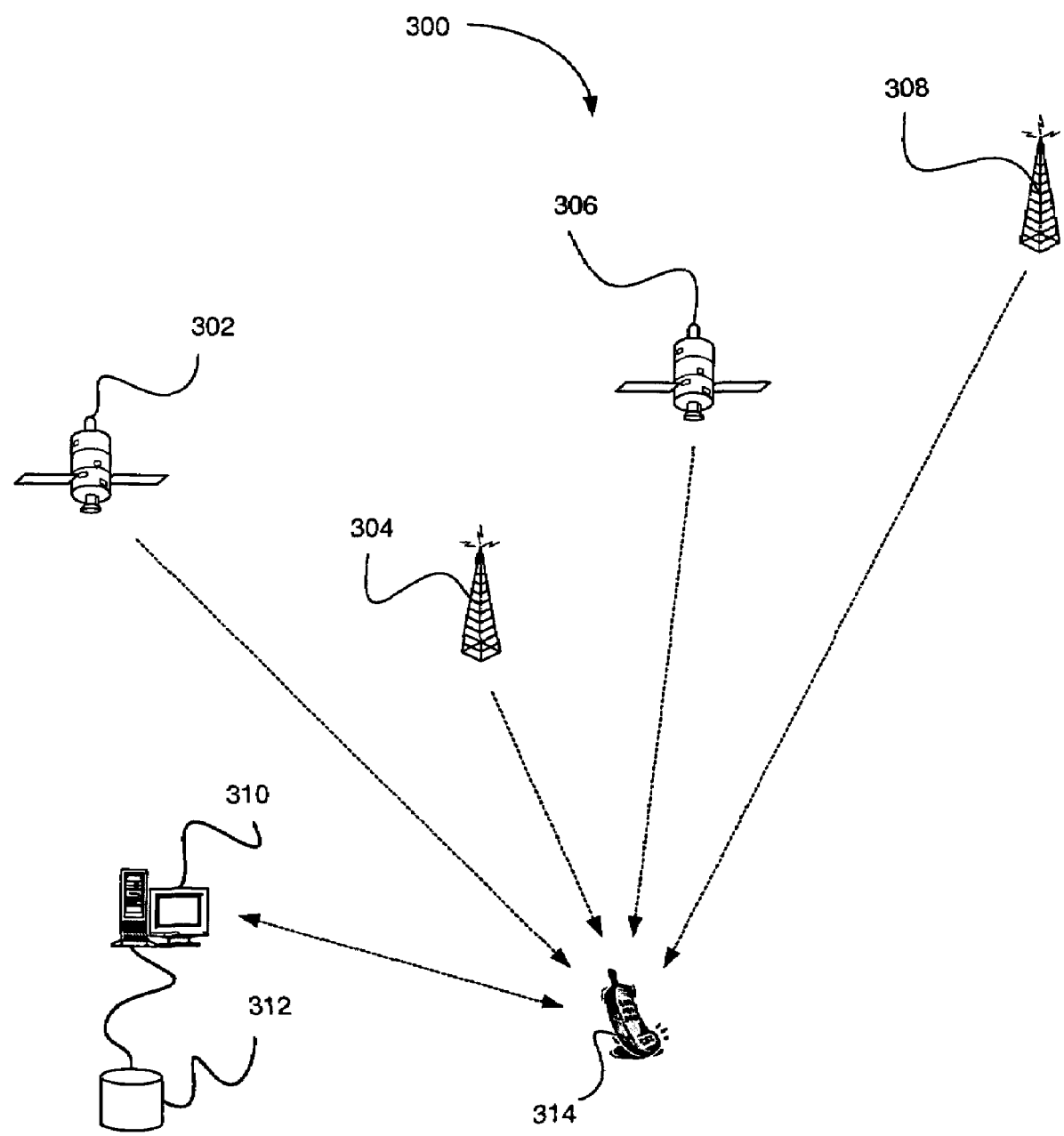
FIG. 3A illustrates an example of a position determination system which represents an example environment for use of the invention.

FIG. 3A illustrates an example of a position determination system 300 for estimating the position, velocity or direction of motion of a subscriber station 314 in a wireless communication system. This system is one example of an environment in which systems and methods according to the invention may operate, but it should be appreciated that other environments are possible. Hence, nothing in the description of this example environment should be taken as limiting.

In this system, subscriber station 314 receives signals transmitted by a plurality of sources 302, 304, 306, and 308, visible to a receiver in the subscriber station. As illustrated, the sources may be BTSs, GPS satellites, or combinations of BTSs and GPS satellites. In the example illustrated, sources 302 and 306 are GPS satellites, and sources 304 and 308 are BTSs.

Each of the sources transmits a signal which is modulated with an identification code which uniquely identifies the source. In one implementation, the identification codes are PN codes, which may differ in length or periodicity according to the source involved. For IS-95 compliant CDMA systems, the PN code is a sequence of length 32,768 chips which is repeated every 26.67 msec. In current GPS systems, the PN code is a sequence of length 1,023 chips which is repeated every one millisecond. In other implementations, the source may be identified by other unique global or local identifiers, such as frequency.

The signals transmitted by sources 302, 304, 306, and 308 are all received by the subscriber station 314 in the form of a composite signal. The signals may be received directly or through repeaters (not shown).

A database 312 is accessible to a position determination entity (PDE) 310. In one embodiment, PDE 310 is a serving mobile location center (SMLC). The database 312 embodies one or more almanacs indicating the current positions of each of the sources in the system 300, whether they be base stations, GPS satellites, or combinations of base stations and GPS satellites. In the system 300 illustrated in FIG. 3, these one or more almanacs indicate the current positions of GPS satellites 302 and 306, and base stations 304 and 308.

The subscriber station 314 is equipped with a correlator which, either alone or in conjunction with a processor, is configured to derive a time of arrival measurement for one or more of the pilot signals received from the sources. In deriving these time of arrival measurements, the correlator and/or processor may utilize various forms of assistance provided to it by PDE 310, such as search windows and window centers for one or more of the sources 302, 304, 306, and 308.

The subscriber station 314 then communicates the time of arrival measurements to PDE 310. The PDE 310 utilizes the one or more almanacs embodied in the database 312 to determine the locations of the sources corresponding to the time of arrival measurements. It then determines an estimate of the position, velocity or direction of motion of the subscriber station 314 using known triangulation or trilateration procedures. Once determined, the estimates may be communicated by the PDE 310 to the subscriber station 314 or some other entity. As an alternative to the foregoing, the subscriber station 314 may use the time of arrival measurements to estimate its own position, velocity or direction of motion after accessing the database 312 (through PDE 310) to determine the positions of the signal sources.

Figure 3B:
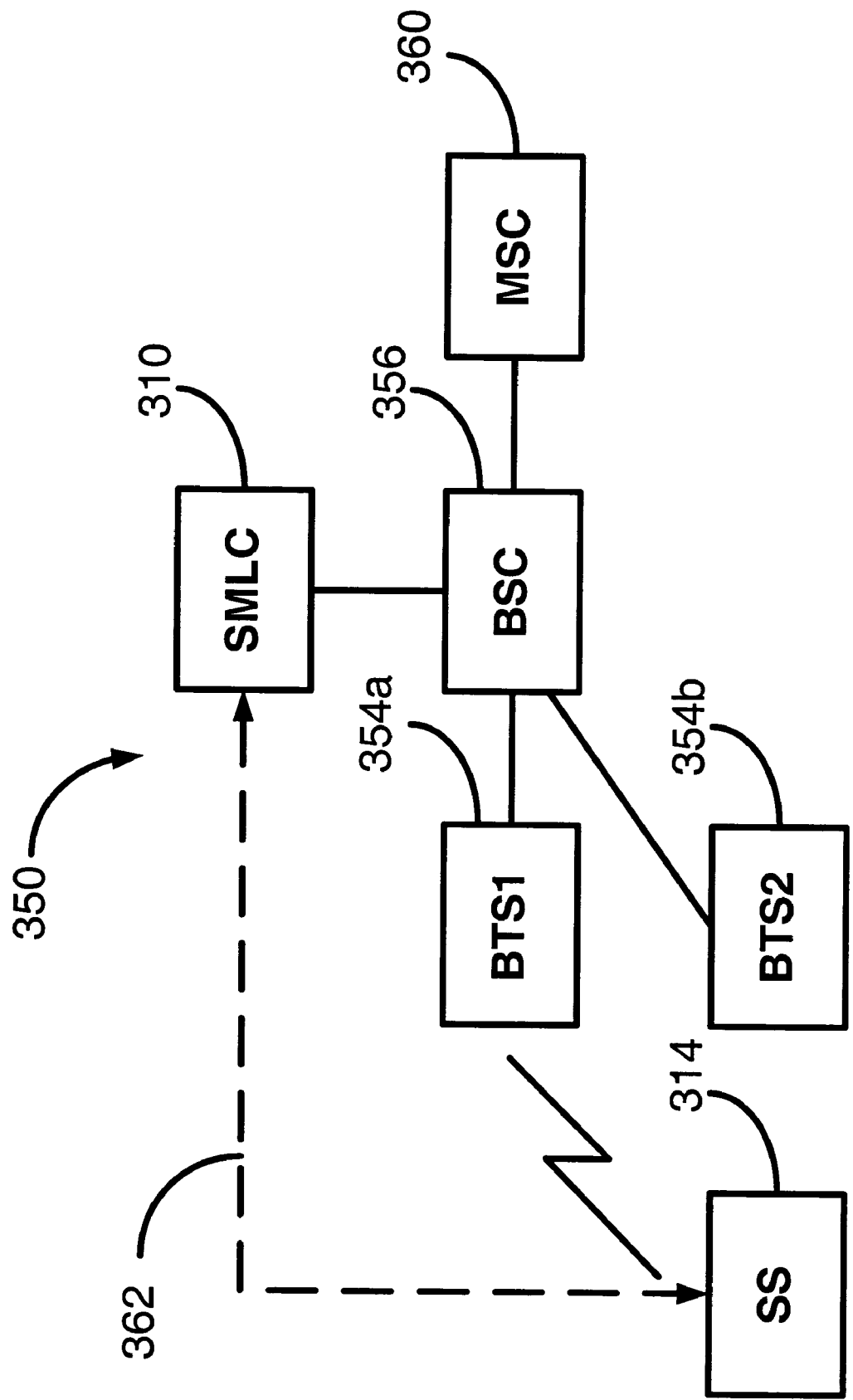
FIG. 3B is a block diagram of an example of a GSM wireless communications system which represents another example environment for use of the invention.

The subscriber station 314 operates within a wireless communications system, an example of which is presented in block diagram form in FIG. 3B. Once again, many other example environments are possible, so nothing in this particular example should be taken as limiting.

In this particular example, the wireless communications system is a GSM cellular system in which the network coverage area is organized into a plurality of cells, with one or more base stations corresponding to each cell. The base stations in the network are organized into groups, with one or more base stations in a group controlled by a base station controller (BSC). In the example of FIG. 3B, n base stations form a group, wherein n is an integer of one or more, and these n base stations are identified with numerals 354a, 354b. All of these n base stations are controlled by BSC 356. Each base station controller in turn is serviced by a mobile switching center (MSC). In the example illustrated in FIG. 3B, BSC 356 is serviced by MSC 360.

SMLC 310 is also accessible to subscriber station 314 through communication link 362 indicated in phantom in FIG. 3B. This communication link is indicated in phantom since the physical communication between the two occurs through one of the base stations 354a, 354b and the BSC 356.

In the particular example illustrated, SMLC 310 provides assistance to the subscriber station 314 in the form of searching windows and searching centers. The subscriber station 314 utilizes this information to search for and derive time of arrival measurements from one or more of the sources 302, 304, 306, and 308 illustrated in FIG. 3A. The subscriber station 314 then communicates these time of arrival measurements to SMLC 310. In response, SMLC 310 determines an estimate of the position, velocity or direction of motion of the subscriber station 314.

In one example, the SMLC 310 obtains at least four time of arrival measurements from subscriber station 314, each corresponding to a different one of the sources. The SMLC 310 accesses one or more almanacs to determine the current position of each of the sources, and then uses known triangulation or trilateration techniques to solve for four unknowns, the coordinates of the position of the subscriber station, which may be represented as x, y, and z, and system or network time t. The SMLC 310 may then store this information and/or communicate it to another entity, including a network entity, or an external location services client, such as a 911 operator, the police, etc.

The SMLC 310 may derive a velocity or direction of motion estimate from two or more solutions. Since system time is provided as a by-product of these solutions, the SMLC 310 may simply determine the displacement of the subscriber station 314 along each of the three coordinate axes, and divide each of the displacements by the time difference to obtain a component for each of the three coordinate axes. Together, the three components define a vector having a magnitude and direction of motion. The magnitude of the vector forms an estimate of the velocity of the subscriber station, while the direction of the vector forms an estimate of the direction of motion of the subscriber station.

For example, a first solution may yield the parameters $x_1$, $y_1$, $z_1$, and $t_1$, and a second solution may yield the parameters $x_2$, $y_2$, $z_2$ and $t_2$. A velocity vector derived from these parameters is a vector having three values, one for each of the x, y, and z coordinate axes. The x component is $(x_2-x_1)/(t_2-t_1)$. The y component is $(Y_2-y_1)/(t_2-t_1)$. The z component is $(z_2-z_1)/(t_2-t_1)$. The magnitude of the vector, which forms the velocity estimate, is the square root of the sum of the squares of the three components. The direction of the vector forms the direction of motion estimate.

EMBODIMENTS OF THE INVENTION

Figure 4:
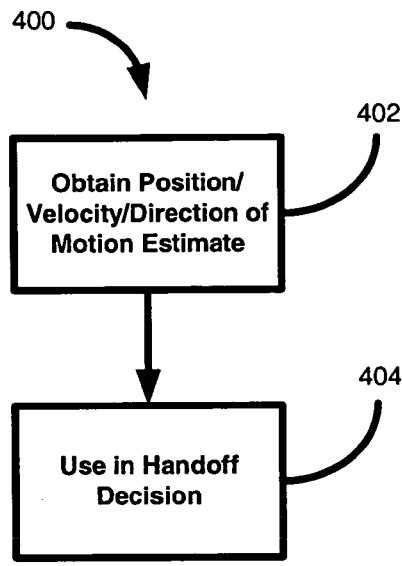

FIG. 4 illustrates an embodiment of a method 400 of supporting a handover decision in a wireless communications system. The method comprises steps 402 and 404. Step 402 comprises obtaining an estimate of the position, velocity or direction of motion of a subscriber station. Step 404 comprises using the estimate, or information derived therefrom, to support the handover decision.

Figure 5:
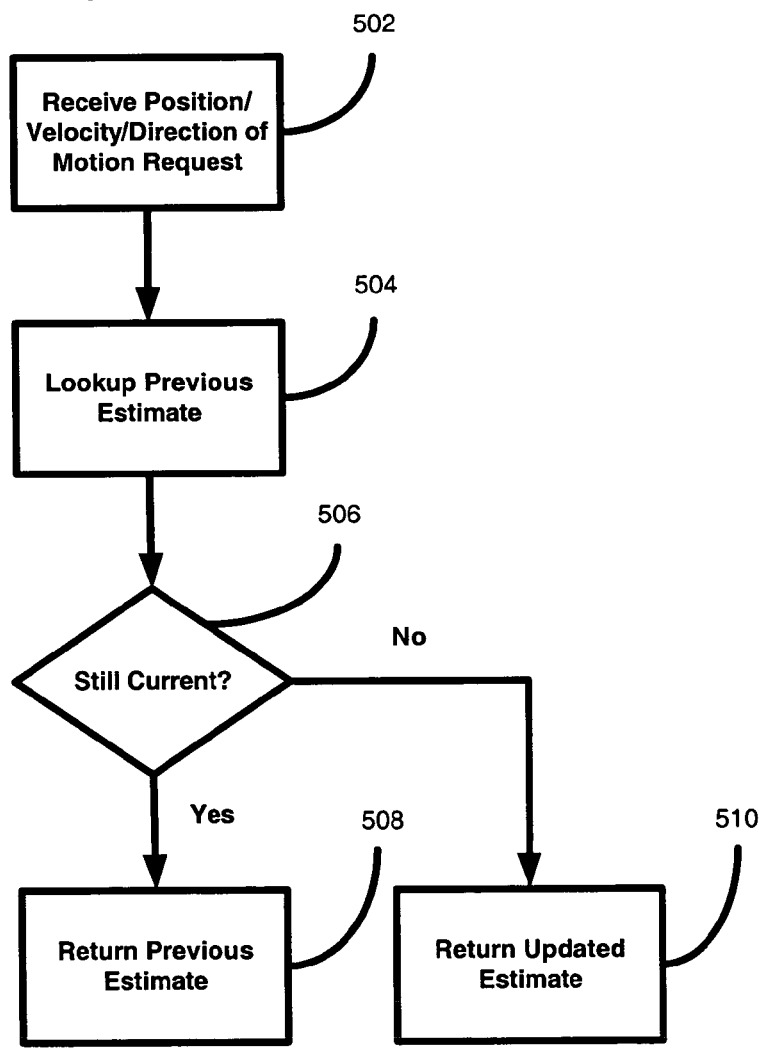
FIG. 5 is a flowchart of one embodiment of a method of obtaining a position, velocity or direction of motion estimate in response to a request.

The obtaining step may comprise obtaining the estimate from an entity in a position determination system, such as a PDE or SMLC. In one embodiment, illustrated in FIG. 5, a request for the estimate is received by the entity in step 502. In response, in step 504, the entity retrieves a stored estimate representing a previously obtained estimate. Then, in inquiry step 506, the entity determines if the stored estimate is sufficiently current to be accurate. If so, in step 508, the stored estimate is returned to the requester. If the stored estimate is insufficiently current to be accurate, then in step 510, the entity derives and returns to the requester an updated estimate. In one embodiment, the entity derives the updated estimate from measurements provided to it by the subscribed station, and then returns this derived estimate to the requestor.

The step of obtaining the estimate may be performed in response to a triggering event. In one embodiment, the triggering event is a determination that the handover rate of the subscriber station, i.e., the number of handovers experienced by the subscriber station within a prescribed time period, exceeds a threshold while the subscriber station is within the coverage area of an umbrella cell. The determination may itself be prompted by a handover of the subscriber station to a micro-cell at least partially within the coverage area of the umbrella cell. The threshold may be a predetermined threshold or a dynamic threshold.

Figure 6:
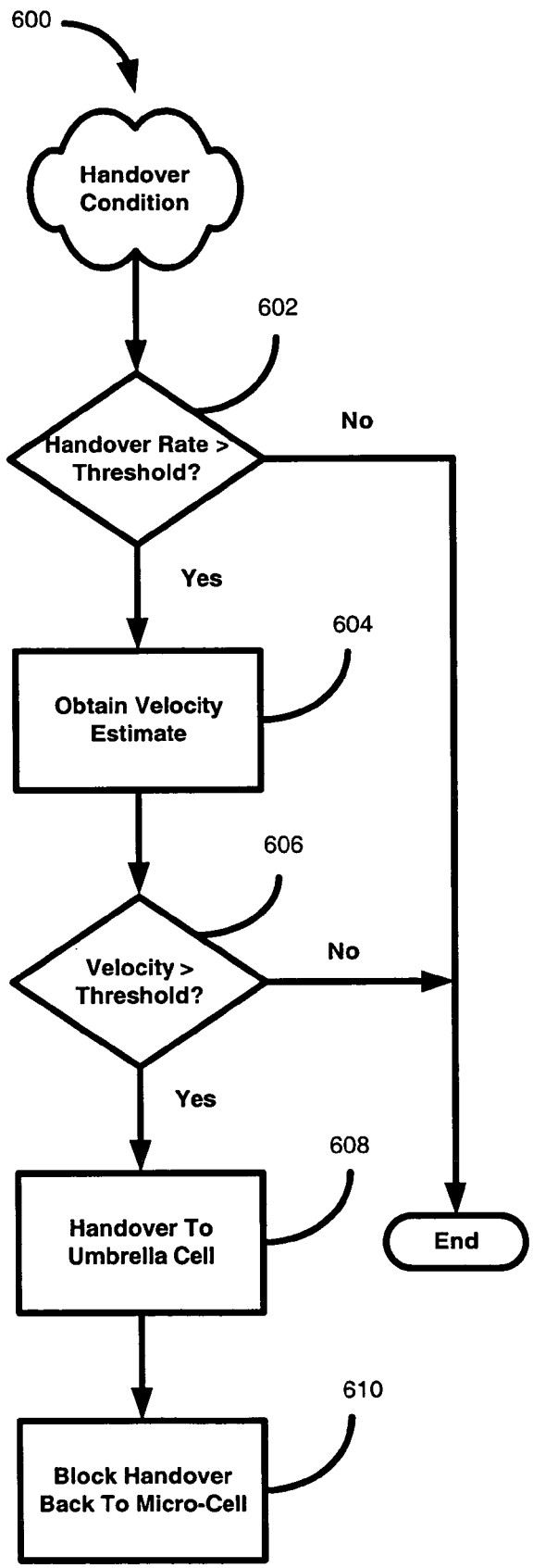
FIG. 6 is a flowchart of one embodiment of a method of supporting a handover decision for a subscriber station moving within the coverage area of an umbrella cell at a velocity exceeding a threshold.

An implementation 600 of this embodiment is illustrated in FIG. 6. In this implementation, the handover rate of the subscriber station is determined when the subscriber station experiences a handover to a micro-cell at least partially within the coverage area of an umbrella cell. Inquiry step 602 is then performed. In inquiry step 602, it is determined whether the handover rate exceeds a threshold. If not, the method ends. If so, step 604 is performed. Step 604 comprises obtaining an estimate of the velocity of the subscriber station. Inquiry step 606 is then performed. In inquiry step 606, it is determined whether the velocity estimate exceeds a threshold. If not, the method terminates. If so, step 608 is performed. In step 608, a handover of the subscriber station to the umbrella cell is performed. Step 610 follows step 608. In step 610, a handover back to a micro-cell is blocked at least for a time.

This embodiment seeks to reduce excessive handovers by detecting when a subscriber station within the coverage area of an umbrella cell is experiencing a high handover rate and is moving at a high velocity. If both these conditions are present, the embodiment implements a handover of the subscriber station to the umbrella cell, and blocks, at least for a time, a handover back to a micro-cell.

Figure 7:
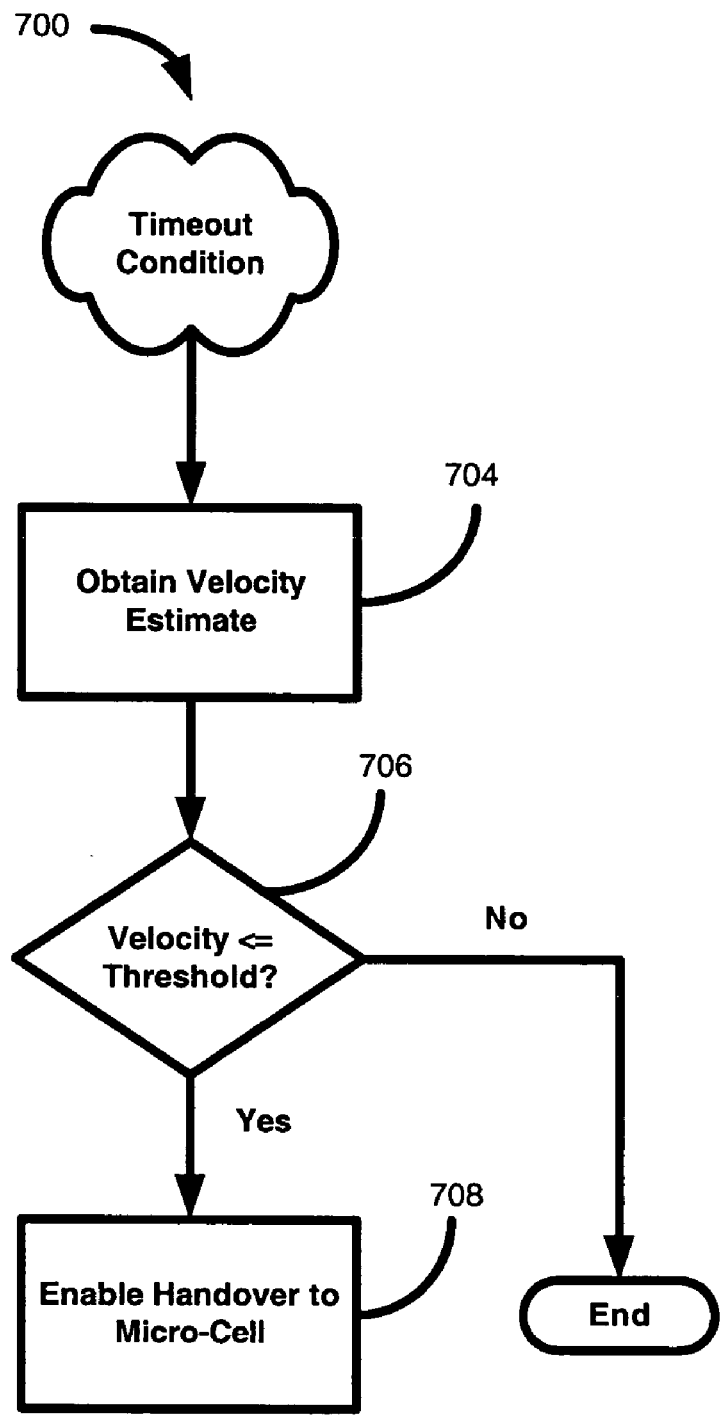
FIG. 7 is a flowchart of second embodiment of a method of supporting a handover decision for a subscriber station moving within the coverage area of an umbrella cell at a velocity less than or equal to a threshold.

FIG. 7 illustrates an embodiment 700 which is triggered by a timeout condition occurring while the subscriber station is within the coverage area of and is being serviced by an umbrella cell. This timeout condition indicates that the subscriber station has not experienced a handover within a prescribed period of time.

In response, step 704 is performed. Step 704 comprises obtaining an estimate of the velocity of the subscriber station. Inquiry step 706 follows step 704. In inquiry step 706, a determination is made whether the velocity of the subscriber station is less than or equal to a threshold. If not, the method ends. In so, step 708 is performed. In step 708, a handover to a micro-cell is enabled.

This embodiment may be performed after the subscriber station has been handed over to an umbrella cell pursuant to the method of FIG. 6. It seeks to allow the subscriber station to be handed back to a micro-cell (for purposes of load balancing or the like) once the velocity of the subscriber station has sufficiently abated so that the risk of excessive handovers is no longer a problem.

Figure 8:
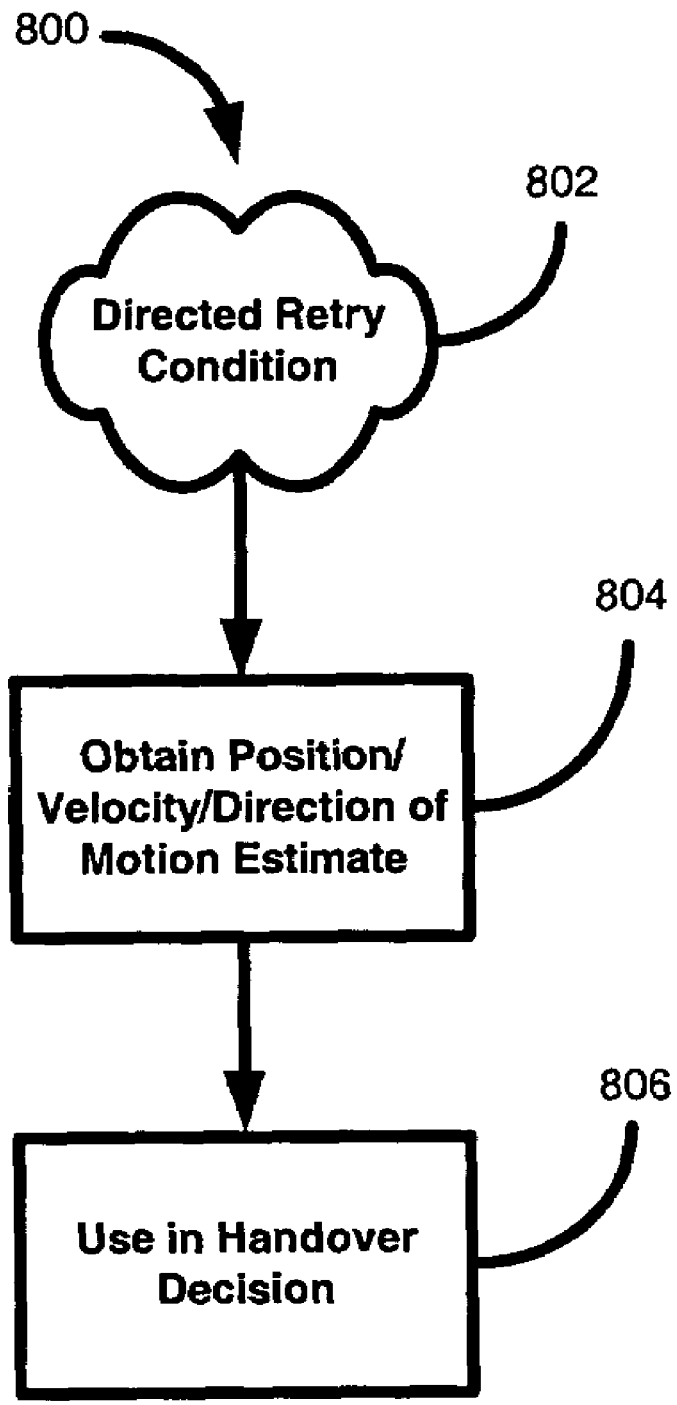
FIG. 8 is a flowchart of one embodiment of a method of supporting a handover decision for a subscriber station subject to a directed retry condition.

FIG. 8 illustrates an embodiment which is triggered by a directed retry condition which itself is prompted by a blocked call or the like experienced by the subscriber station. In this embodiment, step 804 is performed responsive to the occurrence of the directed retry condition. Step 804 comprises obtaining an estimate of the position, velocity or direction of motion of the subscriber station. Step 806 is then performed. In step 806, the estimate, or information derived there-from, is used to support a handover of the subscriber station. The purpose of the handover is to provide the subscriber station with sufficient network resources so that the blocked call can proceed without the need for a queue.

In one implementation, one or more estimates relating to the subscriber station are obtained responsive to a directed retry condition. For example, an estimate of the position and the velocity of the subscriber station may be obtained responsive to the occurrence of the directed retry condition. Then, a handover is performed if these estimates indicate (1) the subscriber station is positioned closer to a target cell than the serving cell; and/or (2) the subscriber station is moving towards the target cell and away from the serving cell.

In one embodiment, a system according to the invention comprises one or more entities configured to perform any of the embodiments, implementations, examples, or variants of the methods which have been described or suggested. In one implementation, the one or more entities comprise one or more of the entities illustrated in FIG. 3B.

In one example, the one or more entities comprise a base station controller (BSC) and a serving mobile location center (SMLC). The SMLC is configured to receive a request for an estimate of position, velocity or direction of motion of a subscriber station. In response, the SMLC obtains the estimate, and provides it to the BSC, which uses the estimate, or information derived there-from, to support a decision whether to execute an intra-BSC handover, i.e., a handover from one BTS controlled by the BSC to another.

In a second example, the one or more entities comprise a mobile switching center (MSC) and a SMLC. As before, the SMLC is configured to receive a request for an estimate of position, velocity or direction of motion of a subscriber station. In response, the SMLC obtains the estimate and provides it to the MSC. The MSC then uses the estimate, or information derived there-from, to support a decision whether to execute an inter-BSC handover, i.e., a handover from one BSC serviced by the MSC to another.

In one embodiment, the one or more entities are configured to obtain an estimate of position, velocity or direction of motion of a subscriber station by retrieving a stored estimate which is sufficiently current to be accurate, and deriving an updated estimate if the previously stored estimate is insufficiently current to be accurate.

The one or more entities may be configured to obtain an estimate of position, velocity, or direction of motion of a subscriber station in response to a triggering event. In one embodiment, the triggering event comprises a determination that the handover rate of the subscriber station exceeds a threshold while the subscriber station is within the coverage area of an umbrella cell. The threshold may be a predetermined or dynamic threshold. In one implementation, this determination is prompted by the occurrence of a handover of the subscriber station to a micro-cell. In response, the one or more entities are configured to obtain an estimate of the velocity of the subscriber station, and handover the subscriber station to the umbrella cell if the estimate of the velocity of the subscriber station exceeds a predetermined threshold. The one or more entities may then block, at least for a time, a handover back to a micro-cell.

In one embodiment, the triggering event is a timeout condition which occurs while the subscriber station is within the coverage area of an umbrella cell. In one implementation, the subscriber station is being serviced by the umbrella cell at the time of the timeout condition. In this implementation, the timeout condition indicates that the subscriber station has not experienced a handover within a prescribed period of time.

In response to this triggering event, the one or more entities are configured to obtain an estimate of the velocity of the subscriber station, and enable handover the subscriber station from the umbrella cell to a micro-cell if the estimate of the velocity of the subscriber station is less than or equal to a threshold.

In a third embodiment, the triggering event is a directed retry condition prompted by a blocked call or the like experienced by the subscriber station. In response to this triggering event, the one or more entities are configured to obtain an estimate of position, velocity or direction of motion of the subscriber station, and then use the estimate, or information derived there-from, to support a handover decision.

In one example, a plurality of estimates relating to the subscriber station are obtained, and the handover executed if the estimates indicate (1) the subscriber station is positioned closer to a target cell than the serving cell; or (2) the subscriber station is moving towards the target cell and away from the serving cell.

While various embodiments of the invention have been described, it will be apparent to those of ordinary skill in the art that many more embodiments and implementations are possible that are within the scope of this invention.

What is claimed is:

1. A method of supporting a handover decision in a wireless communication system comprising:
   obtaining at least four time of arrival measurements for a subscriber station from at least four transmitting sources, wherein the at least four transmitting sources comprise known locations;
   calculating initial $x_1$, $y_1$ and $z_1$ coordinates and network time $t_1$ for the subscriber station;
   calculating a next $x_2$, $y_2$ and $z_2$ coordinates and network time $t_2$ for the subscriber station;
   obtaining a velocity vector for an x component by $(x_2-x_1)/(t_2-t_1)$, a y component by $(y_2-y_1)/(t_2-t_1)$ and a z component by $(z_2-z_1)/(t_2-t_1)$;
   obtaining a magnitude of the vector by $\sqrt{x^2 y^2 z^2}$;
   obtaining an estimate of position of the subscriber stations from the next $x_2$, $y_2$ and $z_2$ coordinates, velocity of the subscriber station from the obtained magnitude of the vector and direction of motion of the subscriber station from a direction of the vector; and
   using the estimate, or information derived there-from, to support the handover decision.

2. The method of claim 1 wherein the obtaining step comprises:
   retrieving a stored estimate and returning the retrieved estimate if sufficiently current to be accurate; and
   deriving an updated estimate and returning the same if the retrieved estimate is insufficiently current to be accurate.

3. The method of claim 1 wherein the obtaining step is performed in response to a triggering event.

4. The method of claim 3 wherein the triggering event comprises a determination that the handover rate of the subscriber station exceeds a threshold while the subscriber station is within the coverage area of an umbrella cell.

5. method of claim 3 wherein the triggering event is a timeout condition occurring while the subscriber station is within the coverage area of an umbrella cell.

6. The method of claim 5 wherein the timeout condition indicates the subscriber station has not experienced a handover within a prescribed period of time.

7. method of claim 3 wherein the triggering event is a directed retry condition.

8. The method of claim 1 wherein the obtaining step comprises obtaining one or more estimates relating to the subscriber station.

9. A system comprising one or more entities configured to perform the methods of claims 1.

10. A system for supporting a handover decision in a wireless communication system, the system comprising:
    at least four transmitting sources for obtaining at least four time of arrival measurements for a subscriber station, wherein the at least four transmitting sources comprise known locations;
    a means for calculating initial $X_1$, $y_1$ and $z_1$ coordinates and network time $t_1$ for the subscriber station;
    a means for calculating a next $x_2$, $y_2$ and $z_2$ coordinates and network time $t_2$ for the subscriber station;
    means for obtaining a velocity vector for an x component by $(x_2-x_1)/(t_2-t_1)$, a y component by $(y_2-y_1)/(t_2-t_1)$ and a z component by $(z_2-z_1)/(t_2-t_1)$;
    means for obtaining a magnitude of the vector by $\sqrt{x^2 y^2 z^2}$;
    means for obtaining an estimate of position of the subscriber stations from the next $x_2$, $y_2$ and $z_2$ coordinates, velocity of the subscriber station from the obtained magnitude of the vector and direction of motion of the subscriber station from a direction of the vector; and
    the system for supporting comprising one or more entities configured to obtain the estimate of position, velocity or direction of motion of a subscriber station; and use the estimate, or information derived there-from, to support the handover decision.

11. The system of claim 10 wherein the one or more entities are configured to obtain the estimate of position, velocity or direction of motion of the subscriber station by retrieving a stored estimate and returning the same if sufficiently current to be accurate; and deriving an updated estimate and returning the same if the retrieved estimate is insufficiently current to be accurate.

12. The system of claim 10 wherein the one or more entities are configured to obtain the estimate of position, velocity, or direction of motion of a subscriber station in response to a triggering event.

13. The system of claim 12 wherein the triggering event comprises a determination that the handover rate of the subscriber station exceeds a threshold while the subscriber station is within the coverage area of an umbrella cell.

14. The system of claim 12 wherein the triggering event comprises a timeout condition indicating the subscriber station has not experienced a handover within a prescribed period of time while the subscriber station is within a coverage area of an umbrella cell.

15. The system of claim 12 wherein the triggering event is a directed retry condition.

16. The system of claim 12 wherein the one or more entities obtain one or more estimates relating the subscriber station responsive to the triggering event.

17. The system of claim 10 wherein the one or more entities comprise a base station controller and a serving mobile location center.

18. The system of claim 10 wherein the one or more entities comprise a mobile switching center and a serving mobile location center.

* * * * *